Oct. 13, 1925.
J. K. ROBINSON
1,556,719
UNIVERSAL BALL JOINT
Filed Sept. 4, 1923
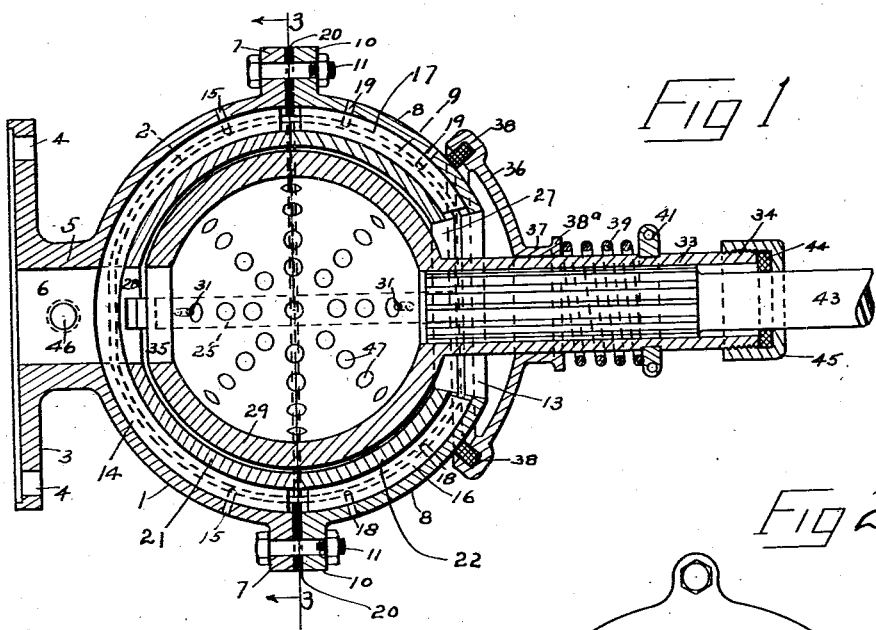
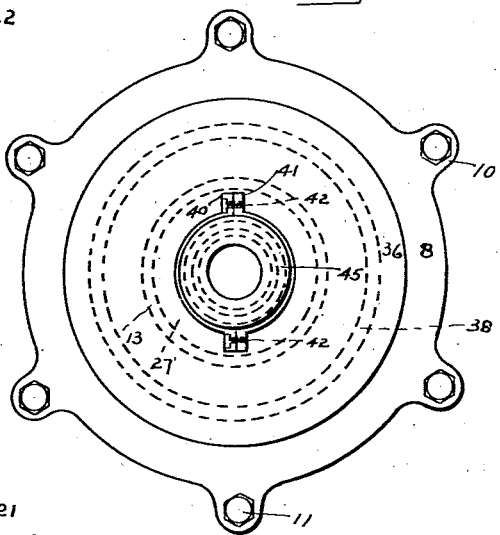
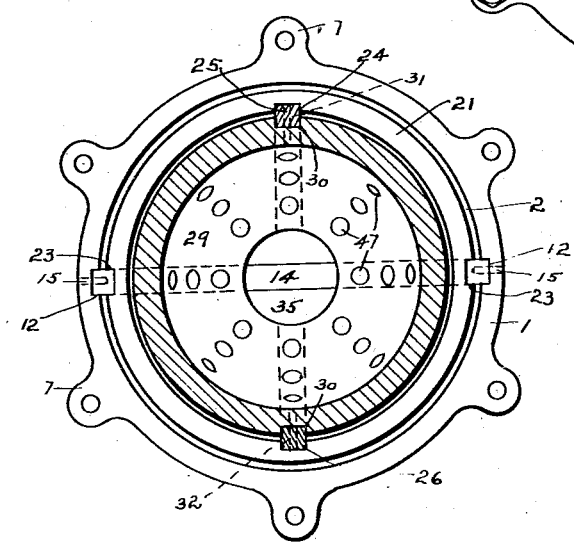
James K. Robinson,
Inventor,
by his Attorney.

Patented Oct. 13, 1925.

1,556,719

UNITED STATES PATENT OFFICE.

JAMES K. ROBINSON, OF JACKSONVILLE, FLORIDA.

UNIVERSAL BALL JOINT.

Application filed September 4, 1923. Serial No. 660,925.

*To whom it may concern:*

Be it known that I, JAMES K. ROBINSON, a citizen of the United States, residing at Jacksonville, in the county of Duval and State of Florida, have invented new and useful Improvements in Universal Ball Joints, of which the following is a specification.

My invention relates to universal ball joints such as are generally used on automobiles, but it may be used on a great variety of other machines where a ball joint is needed. The main and particular objects and advantages of my invention are to provide a ball joint in which the customary pins and bushings are dispensed with.

A further object is to provide a ball joint of very strong and rigid construction, having no parts to become loose or disarranged, to provide ready means for adjustment and taking up the wear and to provide means whereby all the moving parts may be emerged in lubricants.

A still further object is to provide a universal ball joint of few parts, of simple construction, easy to assemble and adjust, and comparatively inexpensive to manufacture.

This and various objects and advantages will be clearly understood from the following specification, and from the accompanying drawing of a preferred embodiment of my invention, but it will be readily understood that various modifications might be made without departing from the scope of my invention.

Fig. 1 is a cross-sectional plan view of my invention.

Fig. 2 is an end view of Fig. 1.

Fig. 3 is a cross-section of Fig. 1, taken on the line 3—3.

The ball joint consists of the main body member 1; this member is semi-spherical in shape and has a semi-spherical recess 2 formed in its interior. A flange 3, having bolt holes 4, is attached to the main body by means of the shoulder 5. An opening 6 extends from the inner spherical recess 2 through the shoulder 5. The main body member is also supplied with a plurality of lugs 7.

A semi-spherical cover 8, having a semi-spherical recess 9 and a plurality of lugs 10, is bolted to the main body member 1 by means of the bolts 11. By bolting the cover 8 and the body member 1 together, a spherical recess is formed within these members. A rectangular groove 12 is cut radially inside of the recess formed between the members 1 and 8. A conical shaped opening 13 is formed in the front part of the cover 8.

A rectangular, semi-circular key 14 is placed in the part of groove 12 formed in the body member 1 and is pinned in place in this groove by means of pins 15. Two similar segmentary keys 16 and 17 are attached to the part of the groove 12 formed in cover 8 and are held in place by means of the pins 18 and 19, respectively. Between the main body 1 and the cover 8 shims 20 are placed; the purpose of these shims will be explained later.

A second hollow, spherical member is placed within the first member, just described, and consists of parts 21 and 22. A rectangular, radial groove 23 is cut around the outside of the parts 21 and 22, and this groove is free to slide on the keys 14, 16, and 17, thus giving the one movement to the universal joint. Inside the members 21 and 22, another rectangular, radial groove 24 is cut diametrically opposite or at right angle to the groove 23. In this groove two keys 25 and 26 are free to move. A conical opening 27 is formed in the front of the part 22, as is plainly shown on Fig. 1. The purpose of the openings 13 and 27 will be explained later. In the rear of the part 21 a circular opening 28 is formed, the purpose of this will also be explained later.

A third, hollow, spherical member 29 is placed within the spherical recess formed between the members 21 and 22. The member 29 is made in one piece, and is provided with a rectangular radial groove 30 in which the keys 25 and 26 are secured by means of the pins 31 and 32, the movement of the keys 25 and 26 in the groove 24 giving the second movement to the universal joint. The front of the member 29 is provided with a forward projecting, hollow shaft 33 which is threaded at its outer end, as shown at 34. The rear end of the member 29 is provided with a circular opening 35.

An oil and dust guard 36 is provided with a projecting shoulder 37 which is free to move on the hollow shaft 33. This guard also forms part of a sphere and has a groove in which a continuous felt strip 38 is inserted. The felt strip engaging in close contact with the outer spherical surface of the cover 8. The shoulder 37 is provided with a flange 38ª. A compression spring 39, wound around the hollow shaft 33, butts against this flange, its other end butting against a split collar, consisting of two parts 40 and 41. This collar is inserted in a shallow groove in the shaft 33 and clamped together by screws 42, as plainly shown on Fig. 2.

On Fig. 1 a splined shaft 43 is shown engaged in the hollow shaft 33. This shaft is free to slide longitudinally in the hollow shaft. To prevent dust from entering the hollow shaft a felt washer 44 and a cap 45, screwed on to the thread 34, is provided.

A tapped hole 46, for the insertion of a suitable oil cup or other lubricating means, is provided in the shoulder 5. Perforations 47 are provided in the spherical member 29 as well as in the semi-spherical members 21 and 22. For simplicity the perforations in the last mentioned members have been omitted on the drawing.

The conical openings 13 and 27 allow ample clearances for the angular movements of the shaft 33, while the dust cap 36, being compelled by its attachment to the shaft 33 to follow the movements of same, always covers these openings. The openings, 6, 28, and 35, together with the lubricating inlet 46, form a ready means of causing lubricant to enter all the parts of the universal joint, the perforations 47 aiding in the distributing of the lubricants and the felt strip 38, owing to the pressure exerted by spring 39, prevents the lubricant from leaking out of the joint. It might be mentioned that when in use the flange 3 is bolted against a solid flange, in the customary way. To recompense for any wear which may occur within the joint, the shims 20 are provided so that the member 1 and the cover 8 may be brought closer together by the removal of part of the shims.

It will be readily seen, that while keys of rectangular cross-section have been shown and described, keys of other cross-sections might be used, for example, circular. In like manner, while the fastening means of the device has been shown as a flange 3, other suitable fastening means might be employed.

I claim:

In a universal joint, of the class described; an outer, hollow, spherical member consisting of two parts bolted together, one of said parts provided with a hollow attaching means, the other provided with a conical opening; an intermediate, hollow, spherical member also consisting of two parts, one of said intermediate parts provided with an opening aligning with the said attaching means, the other intermediate part provided with a conical opening aligning with the conical opening in the outer member; an inner, hollow, spherical member provided with an opening communicating with its interior and aligning with the openings in the intermediate part and the attaching means, for the purpose of lubrication; an operating shaft rigidly attached to the said inner member and projecting through the conical openings in the other members; co-operating grooves formed in the outer, intermediate and inner members, the said grooves in the outer and inner members being at right angles to each other; and keys operating in said grooves forming a driving connection therebetween.

In testimony whereof I, JAMES K. ROBINSON, have signed my name to this specification this 24th day of August, 1923.

JAMES K. ROBINSON.